US008611348B2

(12) United States Patent
Boers et al.

(10) Patent No.: US 8,611,348 B2
(45) Date of Patent: *Dec. 17, 2013

(54) SOURCE SPECIFIC MULTICAST GROUP TO SOURCE MAPPING

(75) Inventors: Arjen Boers, Sitges (ES); Ijsbrand Wijnands, Leuven (BE)

(73) Assignee: Cisco Technology, Inc., San Jose, CA (US)

( * ) Notice: Subject to any disclaimer, the term of this patent is extended or adjusted under 35 U.S.C. 154(b) by 315 days.

This patent is subject to a terminal disclaimer.

(21) Appl. No.: 13/074,356

(22) Filed: Mar. 29, 2011

(65) Prior Publication Data

US 2011/0176545 A1 Jul. 21, 2011

Related U.S. Application Data

(63) Continuation of application No. 10/208,977, filed on Jul. 31, 2002, now Pat. No. 7,936,752.

(51) Int. Cl.
*H04L 12/28* (2006.01)

(52) U.S. Cl.
USPC .......................................... 370/390; 370/465

(58) Field of Classification Search
None
See application file for complete search history.

(56) References Cited

U.S. PATENT DOCUMENTS

| 5,959,989 | A | 9/1999 | Gleeson et al. | 370/392 |
|---|---|---|---|---|
| 6,182,147 | B1 | 1/2001 | Farinacci | 709/238 |
| 6,317,434 | B1 | 11/2001 | Deng | 370/432 |
| 6,331,983 | B1 | 12/2001 | Haggerty et al. | 370/400 |
| 6,457,059 | B1 | 9/2002 | Kobayashi | 709/242 |
| 6,597,703 | B1 | 7/2003 | Li et al. | 370/428 |
| 6,631,420 | B1 | 10/2003 | Li et al. | 709/242 |
| 6,633,765 | B1 | 10/2003 | Maggenti et al. | 455/503 |
| 6,654,371 | B1 | 11/2003 | Dunstan et al. | 370/390 |
| 6,711,172 | B1 | 3/2004 | Li | 370/401 |
| 6,853,639 | B1 | 2/2005 | Watanuki et al. | 370/390 |
| 6,947,440 | B2 | 9/2005 | Chatterjee et al. | 370/390 |
| 6,963,573 | B1 | 11/2005 | Cain et al. | 370/401 |
| 6,970,461 | B2 | 11/2005 | Unitt et al. | 370/390 |
| 6,988,146 | B1 | 1/2006 | Magret et al. | 709/238 |
| 7,012,891 | B1 | 3/2006 | Chandran et al. | 370/230 |
| 7,061,880 | B2 | 6/2006 | Basilier | 370/312 |
| 7,233,987 | B2 | 6/2007 | Watkinson | 709/223 |

(Continued)

FOREIGN PATENT DOCUMENTS

| AU | 2003 257074 | 7/2002 | H04L 12/18 |
|---|---|---|---|
| CN | ZL 03 8 18291.2 | 7/2003 | H04L 12/18 |

(Continued)

OTHER PUBLICATIONS

S. Deering, "RFC1112—Host Extensions for IP Multicasting," Internet RFC/STD/FYI/BCP Archives, Aug. 1989, pp. 1-13, http://www.faqs.org/rfcs/rfc1112.html.

(Continued)

*Primary Examiner* — Michael J Moore, Jr.
(74) *Attorney, Agent, or Firm* — Campbell Stephenson LLP (57) ABSTRACT

A system and method of generating a channel address. The method includes mapping a first address, obtained from a membership report, to a second address to generate a channel address. A multicast network device (MND) for subscribing one or more hosts on a multicast network to one or more channels is disclosed. The MND includes a memory containing a first address and a SSM mapping engine configured to map the first address to a second address to generate a channel address, identifying a channel, in response to the first address contained in the memory.

16 Claims, 4 Drawing Sheets

(56) References Cited

U.S. PATENT DOCUMENTS

| | | | |
|---|---|---|---|
| 7,310,335 B1 | 12/2007 | Garcia-Luna-Aceves et al. ............................ | 370/390 |
| 7,418,003 B1 | 8/2008 | Alvarez et al. ................ | 370/432 |
| 7,502,372 B2 | 3/2009 | Tsuchiya et al. .............. | 370/390 |
| 2002/0091926 A1 | 7/2002 | Fukutomi ...................... | 713/170 |
| 2002/0191584 A1 | 12/2002 | Korus et al. ................... | 370/349 |
| 2003/0035398 A1 | 2/2003 | Sato .............................. | 370/338 |
| 2004/0022244 A1 | 2/2004 | Boers et al. ................... | 370/390 |
| 2004/0100983 A1 | 5/2004 | Suzuki ........................... | 370/432 |
| 2004/0122890 A1 | 6/2004 | Watkinson .................... | 709/203 |
| 2005/0076207 A1 | 4/2005 | Park et al. ..................... | 713/163 |
| 2006/0062220 A1 | 3/2006 | Suga .............................. | 370/392 |
| 2006/0088031 A1 | 4/2006 | Nalawade ..................... | 370/390 |
| 2006/0133375 A1 | 6/2006 | Napierala ...................... | 370/390 |
| 2006/0159091 A1 | 7/2006 | Boers et al. ................... | 370/390 |
| 2006/0159092 A1 | 7/2006 | Boers et al. ................... | 370/321 |

FOREIGN PATENT DOCUMENTS

| | | | | |
|---|---|---|---|---|
| EP | 07122045.3 | 11/2007 | ............. | H04L 12/18 |
| WO | WO 00/51370 A1 | 8/2000 | | |
| WO | WO 02/45334 A1 | 6/2002 | | |
| WO | WO 2004/012390 A1 | 2/2004 | ............. | H04L 12/18 |

OTHER PUBLICATIONS

"Stephen's Multicast Study: Protocol Independent Multicast (PIM)," NIST/ITL Advanced Network Technologies Division Software Distribution, Jun. 14, 1998, pp. 1-8, http://dns.antd.nist.gov/snad-staff/night/multicast/multpim.html.

"Source Specific Multicast (SSM) Homepage," Cisco IOS Software—IP Multicast Development & Dev/Test Groups, Nov. 29, 2000, pp. 1-6, ftp://flpeng.cisco.com/ipmulticast/ssm/index.html.

H. Holbrook and B. Cain, "Source-Specific Multicast for IP," Internet Engineering Task Force (IETF), Nov. 21, 2001, pp. 1-14, http://www.ietf.org/internet-drafts/draft-ietf-ssm-arch-00.txt.

B. Haberman, "IGMPv3 and Multicast Routing Protocol Interaction," Internet Engineering Task Force (IETF), Feb. 2002, pp. 1-5, http://www.ietf.org/internet-drafts/draft-ietf-magma-igmpv3-and-routing-02.txt.

Supratik Bhattacharyya et al., "An Overview of Source-Specific Multicast (SSM)," Internet Engineering Task Force (IETF), Mar. 4, 2002, pp. 1-13, http://www.ietf.org/internet-drafts/draft-ietf-ssm-overview-03.txt.

IP Multicast Technology Overview, Cisco Systems, Inc., Apr. 18, 2002, pp. 1-24, http://www.cisco.com/univercd/cc/td/doc/cisintwk/intsolns/mcst_sol/mcst_ovr.htm.

Brad Cain et al., "Internet Group Management Protocol, Version 3," Internet Engineering Task Force (IETF), May 2002, pp. 1-38.

Holbrook, Hugh W. and Cheriton, David R., "IP Multicast Channels: Express Support for Large-Scale Single-Source Applications," Computer Communications Review, Association for Computing Machinery, vol. 29, No. 4, Oct. 1999, pp. 65-78.

"Multicast Routing on the Internet," Multicast Communication, Protocols and Applications, May 12, 2000, pp. 105-121.

Int'l. Search Report as mailed from the PCT on Nov. 28, 2003 for counterpart WO Application (PCT/US03/23944; Filed Jul. 31, 2003), 7 pages.

Estrin, et al., "Protocol Independent Multicast-Sparse Mode (PIM-SM): Protocol Specification", Internet Draft of the IETF, Sep. 9, 1997, pp. 1-51.

SOURCE SPECIFIC MULTICAST GROUP TO SOURCE MAPPING

CROSS REFERENCE TO RELATED APPLICATIONS

The present patent application is a continuation of U.S. patent application Ser. No. 10/208,977, filed on Jul. 31, 2002, now U.S. Pat. No. 7,936,752, entitled "Source Specific Multicast Group to Source Mapping" and is incorporated by reference herein in its entirety and for all purposes.

BACKGROUND OF THE INVENTION

1. Field of the Invention

The present invention relates generally to internet protocols and, more specifically, to a host subscription management protocol.

2. Description of the Related Art

Internet Protocol (IP) communications generally provide three different types of host communication methods across a network, unicast, broadcast, and multicast. Unicast is a method of point-to-point communication most often used when two hosts need to exchange data with one another and are not concerned with sharing the data with multiple hosts. Broadcast is meant to reach all hosts on a broadcast domain, and multicast allows a group of hosts to receive messages without broadcasting those messages to all of the hosts in a broadcast domain.

An Overview Multicast

Multicast is often the preferred method of communication for many common network distribution applications. This is so because multicast is a bandwidth-conserving technology that reduces traffic by simultaneously delivering data to multiple hosts. An example of an application which utilizes multicast is a video conferencing application. Those hosts wishing to receive the video can join a group, the group having a multicast group IP address. Once the receivers have joined the multicast group, a server responsible for sending the video need only send the video to the multicast group IP address (as opposed to sending the video specifically to each individual host (unicast), or to every host on the network (broadcast)). Other applications which use multicast include corporate communications, distance learning, and distribution of software, stock quotes, and news.

Multicast delivers data to multiple receivers without burdening the source host. This is so because multicast packets are replicated in the network by multicast-enabled routers at the point where paths diverge (multicast-enabled routers are routers which are configured to support multicasting). In contrast, many alternatives to multicast require the source to send more than one copy of the data.

The Multicast Group

Multicast is based on the concept of a group. A multicast group is an arbitrary group of receivers that express an interest in receiving a particular data stream from a source. A host desiring to receive data sent to a multicast group must join the group using Internet Management Group Protocol (IGMP) (discussed below). Only hosts which are members of a given multicast group can receive data sent to that multicast group.

Internet Group Management Protocol (IGMP)

IGMP is a protocol used by hosts and multicast-enabled routers to form and manage a multicast group. To join a group, a host sends an IGMP membership report to a local multicast router. The membership report indicates to the local multicast router that the host is interested in joining a particular multicast group. The address of the multicast group is included in the membership report. The router, recognizing that the host wishes to join the group, establishes a path form the source to the host, and then forwards data to the host accordingly.

There are multiple versions of IGMP, and, consequently, multiple versions of membership reports. IGMP version 1 (IGMPv1) and IGMP version 2 (IGMPv2) membership reports allow a host to include a group address to identify the group which the host wishes to join. IGMP version 3 (IGMPv3) extends the capabilities of IGMPv1 and IGMPv2 by allowing a host to identify not only the group which the host wishes to join, but also the source the host expects the data to be sent from.

Source Specific Multicast (SSM)

It is possible for multiple sources to transmit data to a single multicast group. For example, one source may transmit stock quotes to a multicast group while another source may transmit video conferencing information to the same multicast group. A host which has joined the multicast group to receive the stock quotes may receive, unwillingly, the video conferencing data as well. To alleviate this potential burden, Source Specific Multicast (SSM) extends existing multicast protocols by providing "source filtering" within a multicast network With source filtering, when a host joins a particular multicast group, the host can specify not only the multicast group the host wishes to join, but also the source from which data sent to the multicast group is expected. Source filtering allows a host to block out unwanted or even malicious data streams sent from unknown sources to the multicast group.

SSM implements source filtering through channels, which can be thought of as an extension of groups. A channel is identified by an SSM group address (G) and a source address (S). A source transmits data to a SSM group address (G). A host can receive the data only by subscribing to the channel (S,G) (pronounced S comma G). Thus, a host preferably needs to know both the SSM group address (G) and the source address (S) before the host can subscribe to a channel. The ability to specify a SSM channel address is provided in IGMPv3 membership report (recall from the description above in which an IGMPv3 report allows a host to provide both a group and a source address).

However, many hosts are not configured with IGMPv3, and/or lack the ability to send an IGMPv3 membership report. Although hosts configured with IGMPv1 or IGMPv2 have the ability to specify a group address in a membership report, such hosts lack the ability to specify a source address. Additionally, the potentially large number of host on a network not configured with IGMPv3, and the lack of an efficient upgrade method suggests that these host may not be configured with IGMPv3 for some time. This greatly limits the use of SSM. Consequently, many applications that were designed to operate in an SSM network are useless until the hosts become IGMPv3 compatible. Accordingly, there exists the need for a system and a method of achieving SSM functionality in a network where one, some or all of the hosts lack the ability to subscribe to a channel.

SUMMARY

A method of generating a channel address is disclosed. The method includes mapping a first address, obtained from a membership report, to a second address to generate a channel address.

In another embodiment, a multicast network device (MND) for subscribing one or more hosts on a multicast network to one or more channels is disclosed. The MND includes a memory containing a first address and a SSM mapping engine configured to map the first address to a second address to generate a channel address, identifying a channel, in response to the first address contained in the memory.

The foregoing is a summary and thus contains, by necessity, simplifications, generalizations and omissions of detail; consequently, those skilled in the art will appreciate that the summary is illustrative only and is not intended to be in any way limiting. As will also be apparent to one of skill in the art, the operations disclosed herein may be implemented in a number of ways, and such changes and modifications may be made without departing from this invention and its broader aspects. Other aspects, inventive features, and advantages of the present invention, as defined solely by the claims, will become apparent in the non-limiting detailed description set forth below.

BRIEF DESCRIPTION OF THE DRAWINGS

The present invention may be better understood, and its numerous objects, features, and advantages made apparent to those skilled in the art by referencing the accompanying drawings.

FIGS. 2(A-B) illustrate the actions involved in enabling host to receive data transmitted on one or more channels according to the present invention.

DETAILED DESCRIPTION

Introduction

Embodiments of the present invention generally allow a host, by providing preferably a single address, to subscribe to and receive data transmitted on a channel within a multicast network. The following sets forth a detailed description of a mode for carrying out the present invention. The description is intended to be illustrative of the invention and should not be taken as limiting.

Network Components

Figure 1:
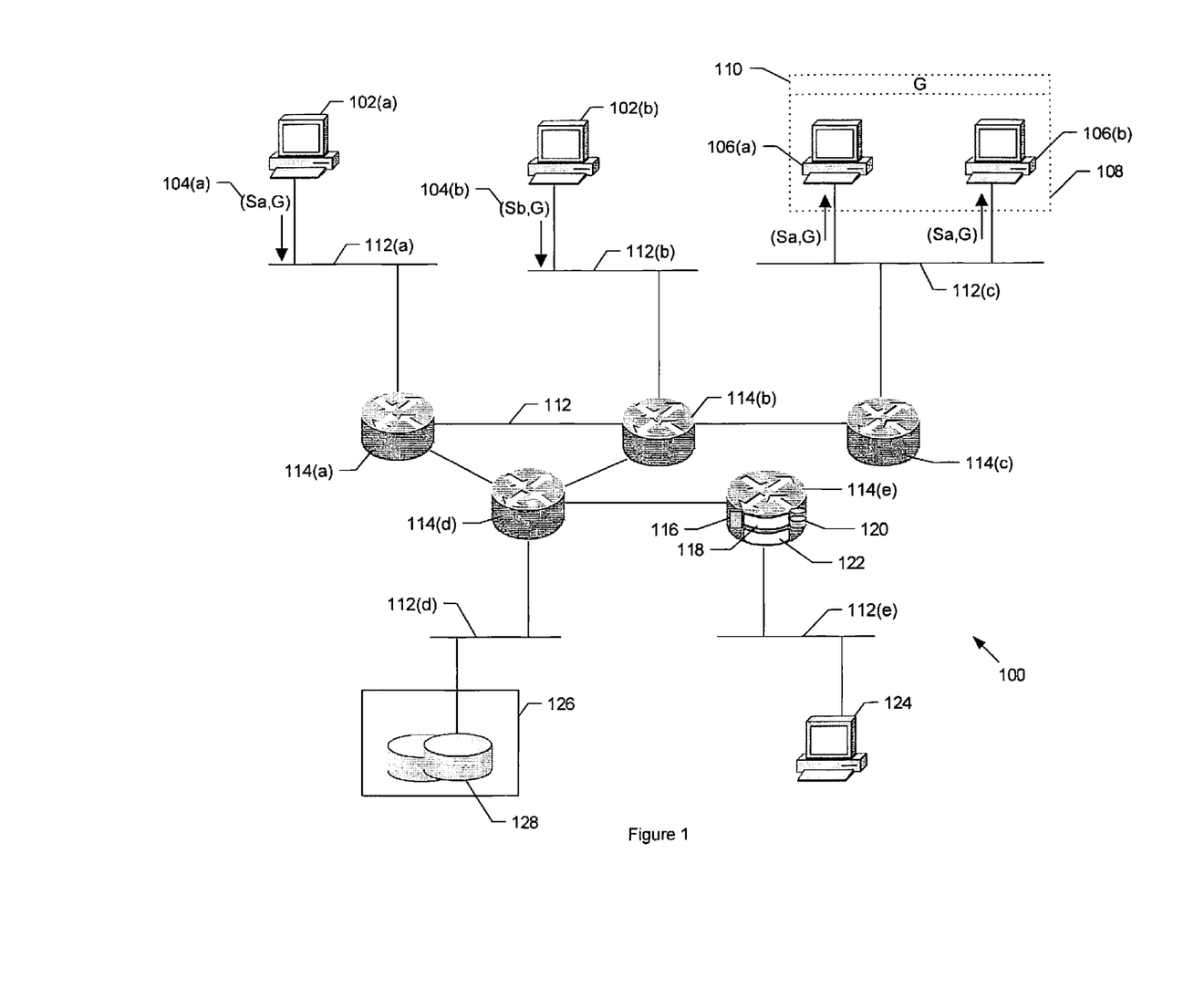
FIG. 1 illustrates an exemplary network according to one embodiment of the present invention.

FIG. 1 illustrates an exemplary network 100 according to one embodiment of the present invention. Network 100 includes sources 102 configured to transmit data on channels 104 to receivers 106. Network 100 is preferably a source specific multicast (SSM) enhanced network configured to support SSM communications. Sources 102 are preferably SSM sources. A SSM source, as used herein, refers to a host that is configured to transmit data to a SSM group address (G). Receivers 106 are preferably SSM receivers. A SSM receiver, as used herein, refers to a host that is configured to receive data transmitted by a SSM source. Although it is preferable that sources 102 and receivers 106 be SSM sources and SSM receivers, respectively, sources 102 and receivers 106 can be any host capable of communicating on network 100. A channel, as used herein, identifies a SSM data path (also referred to as a tree) associated with a SSM source (S) and a destination SSM group address (G). A channel is identified by a channel address (S, G) (pronounced S comma G), where S represents the address of a source configured to transmit data on the channel to the destination SSM group address represented by G.

Receivers 106 are members of a group 108 addressed by group address (G) 110. Group 108 is preferably a SSM group and group address 110 is preferably a SSM group address. However, group 108 and group address 110 may be any group and group address which allow for multicasting communications.

Network 100 also includes communication pathways 112 and multicast network devices (MNDs) 114. Each communication pathway 112 may be a direct communication link, a local area network (LAN), a wide area network (WAN), an IP based network (such as the internet), or some combination thereof. Each MND may be a multicast router, for example, or a similarly configured system capable of processing data on network 100. MND 114(e) includes a memory 116, a SSM mapping engine 118, a SSM mapping database 120, and a messaging engine 122. Although it is not required, one or more other MNDs 114 in addition to MND 114(e) may each include a memory 116, a SSM mapping engine 118, a SSM mapping database 120, and a messaging engine 122. In the described embodiment, messaging engine 122 is an IGMP module, however, messaging engine 122 may also be any other messaging engine used in a multicast network to support multicasting. A host 124 and a system 126, including a database 128, are also connected to network 100.

Network Configuration and Operation

As an aid in understanding the present invention, the described embodiment of the present invention is presented in the context of utilizing a host membership report containing preferably a single address to allow host 124 to subscribe to one or more channels, for example channel 104(a). As used herein, a host membership report refers to data transmitted by a host to indicate the host's desire to become a member of a multicast group. The described configuration of network 100 is presented only to provide a context in which the present invention may be more easily understood and is not intended to be limiting.

Source 102(a) is preferably configured to transmit data on channel 104(a). Channel 104(a) is represented by channel address (Sa, G) to indicate that source 102(a) is preferably configured to transmit data to SSM group address 110 (represented by G). Similarly, SSM source 102(b) is configured to transmit data on channel 104(b). Channel 104(b) is represented by channel address (Sb, G) to indicate that source 102(b) is also configured to transmit data to SSM group address 110. Receivers 106 are preferably configured to receive data only on channel 104(a), and are therefore able to block out any data transmitted on channel 104(b).

Transmitting a Membership Report

Figure 2A:
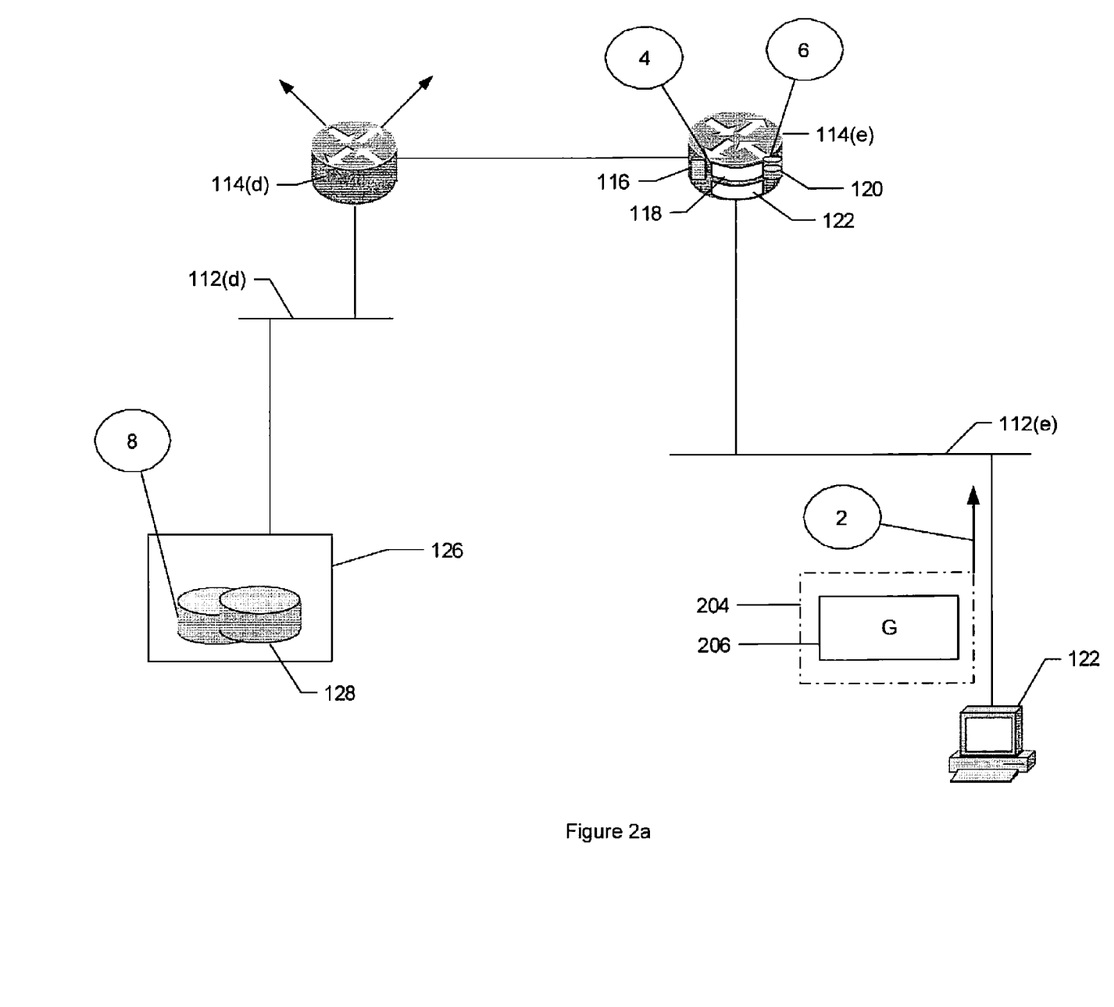
Figure 2B:
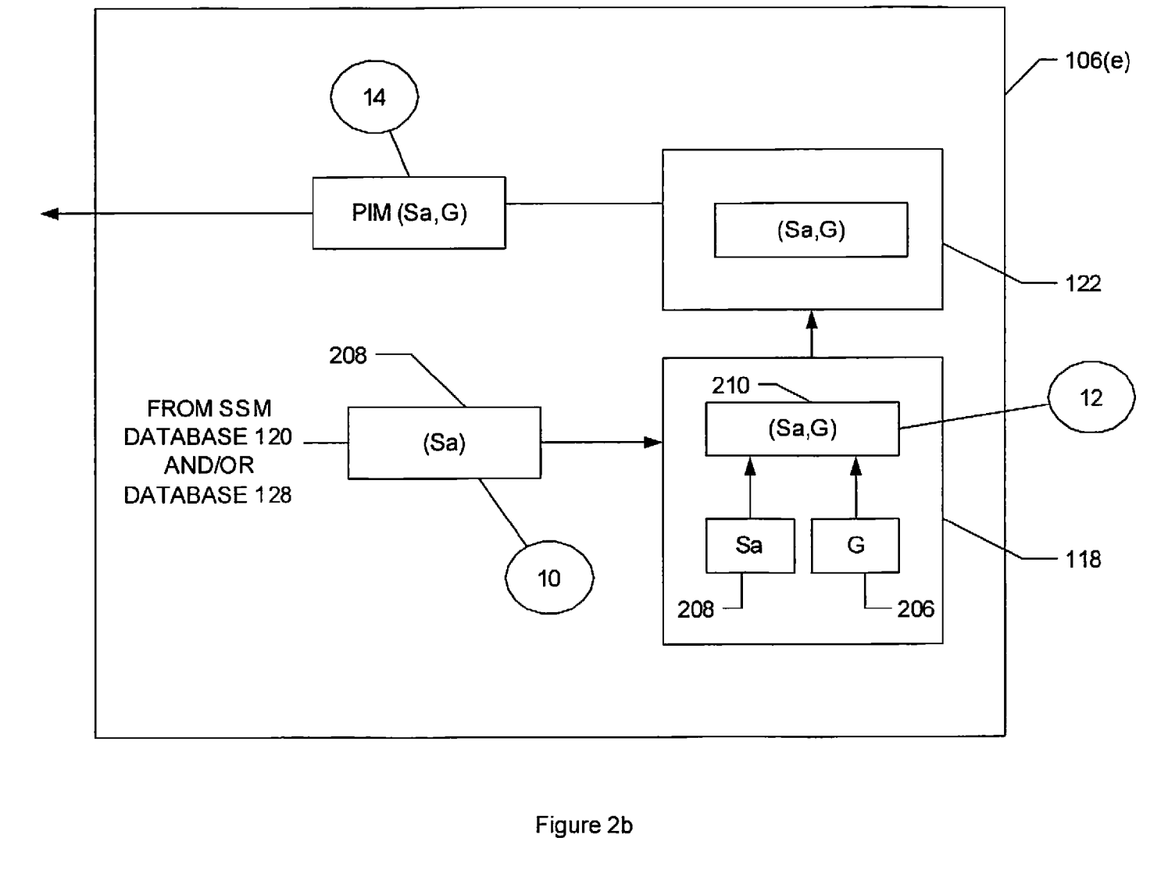

FIGS. 2(A-B) illustrate the actions involved in enabling host 124 to receive data transmitted on channel 104(a) according to the present invention. Initially, at action 2, host 124 transmits a host subscription protocol message 204, including a first address 206, to MND 114(e). Preferably, in the described embodiment, subscription protocol message 204 is an Internet Group Management Protocol version 1 (IGMPv1) or version 2 (IGMPv2) membership report and first address 206 is a SSM group address, for example SSM group address 110, representing the group component of the channel that host 124 wishes to subscribe to. For clarity of description, henceforth, SSM group address 206 will refer to first address 206.

IGMP is a host subscription protocol used by hosts, such as host 124, to report host group memberships to immediately-neighboring multicast routers, such as MND 114(e). In embodiments in which subscription protocol message 204 is an IGMP membership report, the IGMP membership report is preferably sent by the TCP/IP (Transmission Control Protocol/Internet Protocol) stack running on host 124 when an application opens a multicast socket on host 124.

Mapping Addresses

At action 4, messaging engine 120 receives host subscription protocol message 204 in memory 116 and provides the data contained therein, including SSM group address 206, to Source Specific Multicast (SSM) mapping engine 118. In one embodiment of the present invention, MND 114(e) is a multicast router configured to execute computer readable code, and SSM mapping engine 118 consists of multiple modules of computer readable code designed to allow a host, such as host 124, to receive data on a multicast channel, such as channel 104(a).

At action 6, SSM mapping engine 118 receives SSM group address 206 and queries static SSM mapping database 120 to obtain a second address 208 corresponding to SSM group address 206. In the described embodiment, second address 208 is preferably an address of a source (for example SSM source 102(a)) configured to transmit data to a group address, for example SSM group address 206. All corresponding SSM source address(es) found for SSM group address 206, if any, are returned to SSM mapping engine 118 to be cached and further processed as described below. For ease of description, henceforth, SSM source address 208 will be used to refer to second address 208.

The mapping of SSM group address 206 to a corresponding SSM source address 208 is preferably performed at the IGMP layer (i.e., IGMP commands and protocols are utilized). Static SSM mappings should preferably be configured before a query of static SSM mapping database 120 takes place. To configure static SSM mapping database 120, static SSM mapping is enabled, and SSM mapping database 120 is constructed. Preferably, to enable static SSM mapping, the command "ip igmp ssm-map enable" is entered on MND 114(e). To build static SSM mapping database 120, the command "ip igmp ssm-map static <acl-x> <source-x IP address>" is entered, preferably on MND 114(e). The <acl-x> parameter is used to specify the SSM group addresses that are to be mapped to the <source-x IP address> parameter. For example, in the described embodiment, the following commands are preferably entered to build static SSM mapping database 120:

ip igmp ssm-map static <group address> <source 1 address> ip igmp ssm-map static <group address> <source 2 address>

It is recognized that <group address> is the IP address of a group, for example group 108, <source 1 address> is the IP address for a first source, for example source 102(a) to be mapped to the group, and <source 2 address> is the IP address for a second source, for example source 102(b), to also be mapped to the group. This command may be repeated for any number of group address that are to be mapped to the designated source addresses.

At action 8, following the query of static SSM mapping database 120, SSM mapping engine 118 queries database 128 of system 126. In the described embodiment, system 126 is a DNS (Domain Name Server). If desired, the query of database 128 may be disabled with the command: "no ip igmp ssm-map query dns". Domain servers should preferably be configured on MND 114(e) in order to query database 128. This can be accomplished with the following command: "ip domain-server <ip-address>."

In constructing database 128, in order to find the sources corresponding to a particular multicast group, preferably, a reverse DNS lookup is performed with the multicast group IP address using A records. If system 126 includes a corresponding source address for the group address, system 126 will return the corresponding source address. Otherwise system 126 preferably forwards the query to a known root DNS server (not shown). In one embodiment of the present invention, a network administrator of system 126 preferably determines the mapping of source addresses to group address and constructs database 128 accordingly.

At action 10, a source address 208 corresponding to the SSM group address 206 is located within database 128 and is returned to SSM Mapping Engine 118. It is preferable that local configured mappings obtained from static SSM mapping database 120 take priority over dynamic mappings contained with database 128. When received, SSM Mapping Engine 118 preferably caches source address 208 and generates a channel address 210 from SSM group address 206 and SSM source address 208, at action 12.

At action 14, MND 114(e) initiates a Protocol Independent Multicast (PIM) join 210, including the channel address of channel 104(a), to source 102(a). PIM is an independent routing protocol and can be used to construct a shortest communication path between a SSM source (e.g., source 102(a)) and a SSM receiver (e.g., receiver 106(a)). The PIM join message 210 preferably establishes a pathway between host 124 and source 102(a) which allows host 124 to receive data transmitted by source 102(a) on channel 104(a).

Figure 3:
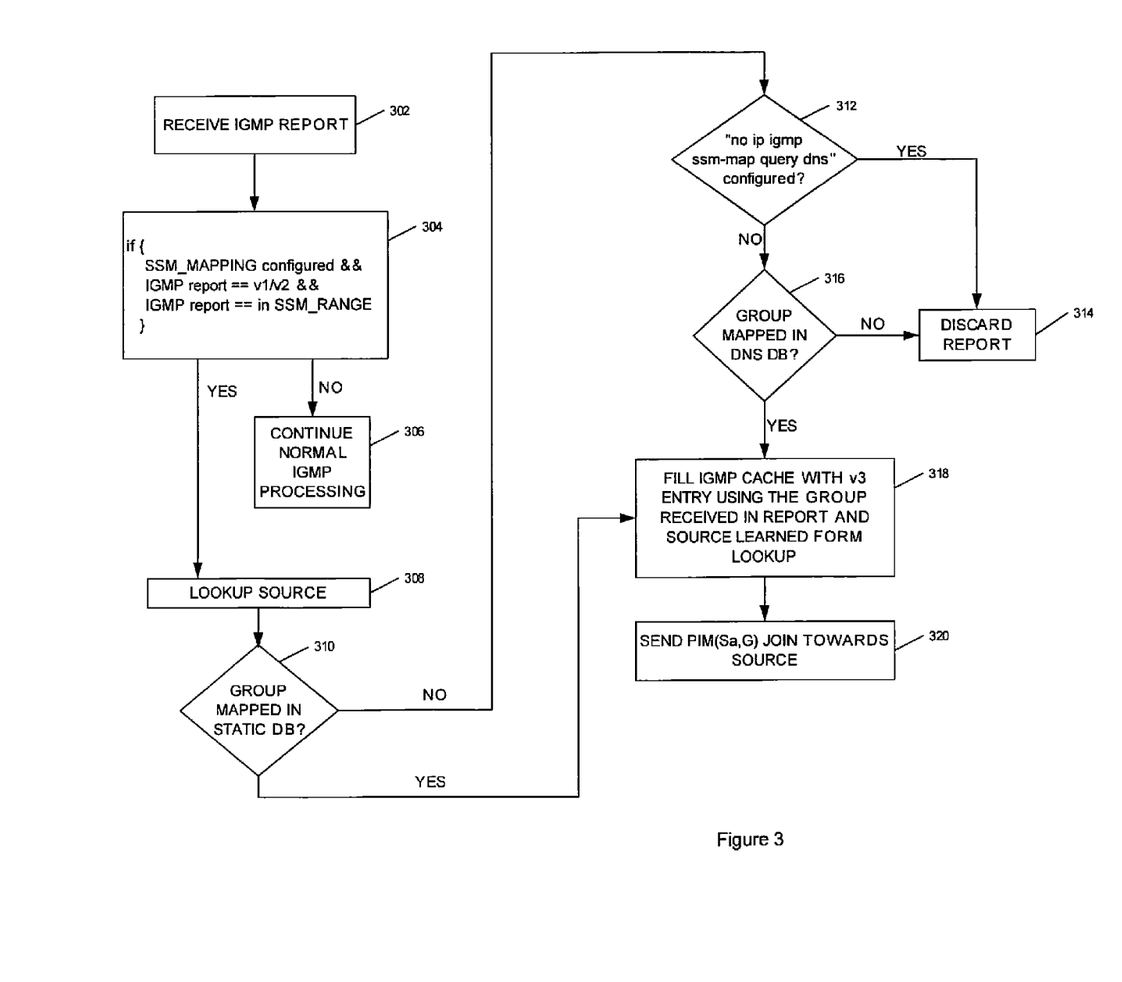
FIG. 3 is a flow chart illustrating the actions generally performed by SSM mapping engine to enable a host to receive data on a channel according to the present invention.

FIG. 3 is a flow chart illustrating the actions generally performed by SSM mapping engine 118 to enable a host, such as host 124, to receive data on a channel, such as channel 104(a), utilizing only an IGMPv1 or IGMPv2 membership report for example, according to the present invention.

Initially, messaging engine 120 receives an IGMP membership report including a group address (e.g., group address 208) in memory 116 (step 302). The group address in the IGMP membership report identifies the group component of the channel (e.g., channel 104(a)) which host 124 wishes to subscribe to. Following the receipt of the IGMP report, SSM mapping engine 118 preferably performs certain verifications, as illustrated by the pseudo-code in step 304. SSM mapping engine 118 preferably verifies that static SSM mappings are configured (as described with reference to FIG. 2 above), that the IGMP report is a valid IGMP v1 or a IGMP v2 report, and that the group address included in the IGMP report is a valid SSM group address. If any one of the verifications fail, SSM mapping engine 118 continues normal IGMP processing. However, if preferably all of the verifications are satisfied, SSM mapping engine 118 queries a SSM static database (e.g., SSM static database 120) and a domain name server (DNS) database (e.g., database 128) for a source address corresponding to the SSM group address provided in the IGMP report (step 308).

SSM mapping engine 118 first queries a SSM static database. Should a corresponding source address (e.g., source address 208) be located, the source address is preferably cached and a channel address is formed (e.g., channel address 210) ("YES" branch of decision block 310 and step 318). However, if a corresponding source address is not located in the SSM static database, SSM mapping engine 118 proceeds to query a DNS database ("NO" branch of decision block 310).

Before querying the DNS database, SSM mapping engine verifies that such a query has been enabled (decision block 312). If the query of the DNS database is not enabled, and no corresponding source address has been located in the SSM static database, the IGMP report is preferably ignored ("YES branch of decision block 312 and step 314). However, if the query of the DNS database is enabled, SSM mapping engine queries the DNS database for a source address corresponding to the group address provided in the IGMP report ("NO" branch of decision block 316 and decision block 316).

If no corresponding source address is located in the DNS database, the IGMP report is preferably ignored ("NO" branch of decision block 316 and step 314). However, if a corresponding source address is located in the DNS database, the corresponding source address is returned to SSM mapping engine 118 where the source address is cached and used to form the channel address (e.g., channel address 210) ("YES" branch of decision block 316 and step 318).

In step 320, SSM mapping engine 118 initiates a Protocol Independent Multicast PIM (Sa,G) join to the source address obtained from the SSM static database and/or the source obtained from the DNS database. In another embodiment of the present invention, SSM mapping engine 118 initiates a PIM (Sx, G) join to one or more or all source addresses obtained from the SSM static database and/or the DNS database (where Sx is the address of the source the PIM join is transmitted to). Joining host 124 to channel 104(a) is also referred to as subscribing host 124 to channel 104(a). The PIM (Sa,G) join establishes a pathway between host 124 and the source identified by the obtained source address. This pathway allows host 124 to receive data transmitted by the source on the corresponding channel (e.g., source 102(a) on channel 104(a)).

While particular embodiments of the present invention have been shown and described, it will be obvious to those skilled in the art that, based upon the teachings herein, changes and modifications may be made without departing from this invention and its broader aspects and, therefore, the appended claims are to encompass within their scope all such changes and modifications as are within the true spirit and scope of this invention. Furthermore, it is to be understood that the invention is solely defined by the appended claims.

What is claimed is:

1. A method performed by a router comprising:
in response to the router receiving a first membership report, accessing a memory that maps multicast group addresses to source addresses in order to read a first source address that is mapped to a first multicast group address;
in response to accessing the memory, the router generating a protocol independent multicast (PIM) join, wherein the PIM join comprises the first multicast group address and the first source address that was read from the memory;
sending the PIM join toward a host corresponding to the first source address; and
receiving data packets comprising the first source address and the first multicast group address;
wherein the first membership report comprises the first multicast group address, but not the first source address.

2. The method of claim 1, wherein the first membership report is an IGMP membership report.

3. The method of claim 2, wherein the first membership report is an IGMP version 1 membership report or an IGMP version 2 membership report.

4. The method of claim 1, wherein the memory is a database of a Domain Name Server (DNS) database or a local Source Specific Multicast (SSM) mapping database.

5. The method of claim 1, further comprising:
the router receiving the first membership report from a host seeking to join a multicast group.

6. The method of claim 1 further comprising:
in response to the router receiving a second membership report, accessing the memory in order to read a second source address that is mapped to a second multicast group address;
in response to accessing the memory, the router generating a second protocol independent multicast (PIM) join, wherein the second PIM join comprises the second multicast group address and the second source address that was read from the memory;
sending the second PIM join toward a second host corresponding to the second source address; and
receiving data packets comprising the second source address and the second multicast group address;
wherein the second membership report comprises the second multicast group address, but not the second source address.

7. A router comprising:
a first circuit for accessing a memory that maps multicast group addresses to source addresses in order to read a first source address that is mapped to a first multicast group in response to the router receiving a first group membership report that comprises the first multicast group address but not the first source address;
a second circuit for generating a protocol independent multicast (PIM) join, wherein the PIM join comprises the first multicast group address and the first source address that was read from the memory;
wherein the second circuit is configured to send the PIM join towards a host corresponding to the first source address.

8. The router of claim 7, wherein the first membership report is an IGMP membership report.

9. The router of claim 8, wherein the first membership report is an IGMP version 1 membership report or an IGMP version 2 membership report.

10. The router of claim 7, wherein the memory is a database of a Domain Name Server (DNS) database or a local Source Specific Multicast (SSM) mapping database.

11. The router of claim 7, further comprising the router comprising an input for receiving the first membership report from a host seeking to join a multicast group.

12. A system comprising:
a first router coupled to a second router;
the first router comprising first, second, and third modules;
wherein the first module is configured for, in response to the first router receiving a first membership report, accessing a memory that maps multicast group addresses to source addresses in order to read a first source address that is mapped to a first multicast group address;
wherein the second module is configured for generating a protocol independent multicast (PIM) join, wherein the PIM join comprises the first multicast group address and the first source address that was read from the memory;
wherein the third module is configured for sending the PIM join to the second router;
wherein the first membership report comprises the first multicast group address, but not the first source address.

13. The system of claim 12, wherein the first membership report is an IGMP membership report.

14. The system of claim 13, wherein the first membership report is an IGMP version 1 membership report or an IGMP version 2 membership report.

15. The system of claim 12, wherein the memory is a database of a Domain Name Server (DNS) database or a local Source Specific Multicast (SSM) mapping database.

16. The system of claim 12, wherein the first router further comprises:
an input for receiving the first membership report from a host seeking to join a multicast group.

* * * * *

UNITED STATES PATENT AND TRADEMARK OFFICE
CERTIFICATE OF CORRECTION

PATENT NO. : 8,611,348 B2
APPLICATION NO. : 13/074356
DATED : December 17, 2013
INVENTOR(S) : Arjen Boers and Ijsbrand Wijnands

Page 1 of 1

It is certified that error appears in the above-identified patent and that said Letters Patent is hereby corrected as shown below:

In the claims

Column 8
Line 16, in Claim 7, replace: "the first multicast" by -- a first multicast --
Line 25, in Claim 8, replace: "first membership" by -- first group membership --
Line 27, in Claim 9, replace: "first membership" by -- first group membership --
Line 34, in Claim 11, replace: "first membership" by -- first group membership --

Signed and Sealed this
Third Day of May, 2016

Michelle K. Lee
*Director of the United States Patent and Trademark Office*